United States Patent
Matluk-Boisseau

(10) Patent No.: US 6,277,434 B1
(45) Date of Patent: Aug. 21, 2001

(54) PET FOOD PRODUCT AND METHODS OF PRODUCT MANUFACTURE AND DISTRIBUTION

(76) Inventor: Sally E. Matluk-Boisseau, 1219 SW. 5th Ct., Ft. Lauderdale, FL (US) 33312

( * ) Notice: Subject to any disclaimer, the term of this patent is extended or adjusted under 35 U.S.C. 154(b) by 0 days.

(21) Appl. No.: 09/579,485

(22) Filed: May 30, 2000

(51) Int. Cl.$^7$ ........................................................ A23K 1/18
(52) U.S. Cl. ........................... 426/635; 426/393; 426/399; 426/805
(58) Field of Search .................... 426/635, 393, 426/399, 805

(56) References Cited

U.S. PATENT DOCUMENTS

| | | | |
|---|---|---|---|
| 4,169,162 | * | 9/1979 | Appleman ............................ 426/335 |
| 4,217,370 | * | 8/1980 | Rawlings et al. ...................... 426/98 |
| 5,492,715 | * | 2/1996 | Greenland et al. .................. 426/658 |
| 5,576,036 | * | 11/1996 | Pesheck et al. ........................ 426/94 |
| 5,945,152 | * | 8/1999 | Purser .................................. 426/646 |

* cited by examiner

*Primary Examiner*—C Sayala
(74) *Attorney, Agent, or Firm*—Oltman, Flynn & Kubler

(57) ABSTRACT

A pet food product includes a mixture of chopped carrots; water; rolled oats; and an acidifying agent, glucono delta lactone. The mixture preferably includes 2.8 percent to 4.9 percent carrots; 67.00 percent to 89.0 percent water; 3.20 percent to 9.9 percent oats; 3.00 percent to 10.25 percent molasses; and 0.20 percent to 1.25 percent glucono delta lactone, all percentages being by weight. A method is provided of making the pet food product which is edible when frozen, the method including the steps of mixing food product ingredients to form a mixture; heating the mixture to a temperature for sufficient length of time to achieve sterilization of the mixture; packing the mixture while the mixture is maintained at a sterilizing temperature within a product package; substantially hermetically sealing the mixture within the product package; and storing the mixture at ambient temperature.

12 Claims, No Drawings

PET FOOD PRODUCT AND METHODS OF PRODUCT MANUFACTURE AND DISTRIBUTION

BACKGROUND OF THE INVENTION

1. Field of the Invention:

The present invention relates generally to the field of pre-packaged food products and to methods of distributing such food products to the end consumer. More specifically the present invention relates to a dog food product having an inventive and nutritious composition and to a preparation process making the product suitable for cost-effective distribution through conventional channels and for an appealing frozen presentation to the animal recipient. The product includes dehydrated or chopped carrots, water, rolled or powdered oats, molasses and an acidifying agent such as glucono delta lactone, mixed in proportions as specified below.

The general combined method of manufacture, distribution and usage include the steps of blending or otherwise mixing product ingredients, subjecting the mixture to a sterilizing heat treatment, enclosing the mixture at a high temperature within a hermetically sealed package, distributing the product to retail stores at ambient temperature and subsequently freezing the mixture prior to presentation to a pet animal. The specific method of manufacture of the product includes the steps of: placing all of the above-referenced ingredients into a mixing vessel in the relative amounts specified in the tables; mixing the ingredients until the oats are hydrated; heating the mixture to 190 degrees F. so that the mixture becomes the product; and then hermetically sealing the mixture within product packaging. While heating the mixture to 190 degrees is an example, the full preferred range is 185 degrees to 190 degrees F., and the broad range is 160 degrees to 195 degrees F. The specific method of distribution and use of the product includes the steps of: transporting the product at ambient temperature from the place of manufacture to shelves of stores selling to the end consumer, namely, the animal owner; freezing the product after purchase; and serving the frozen product to the animal.

2. Description of the Prior Art:

There have long been manufactured foods and treats for dogs and other pet animals. These foods tend to be very similar in general composition and in presented form, and dogs sometimes seem to tire of them. Foods for human beings, on the other hand, are presented in a wide variety of forms. There have been, for example, a few foods for human consumption which are stored at ambient temperature and subsequently frozen prior to serving. Freezer pops are an example of such foods. Yet no similar variation for has been available for pet animals. What is needed for pet animals is a food which is presented in a very different form from what is known in the pet food industry, to provide pet animals with a new dimension of variety in their food.

It is thus an object of the present invention to provide a pet animal food which is presented to the animal for consumption in a frozen state.

It is another object of the present invention to provide such a pet animal food which can be sold at minimal cost because it is transported through ordinary channels of distribution and stored at ambient temperature.

It is still another object of the present invention to provide such an animal food which is nutritious and safe.

It is yet another object of the present invention to provide such an animal food which contains a suitable vitamin and mineral supplement or is a suitable drug delivery system.

It is finally an object of the present invention to provide such an animal food which is attractive in taste as well as form.

SUMMARY OF THE INVENTION

The present invention accomplishes the above-stated objectives, as well as others, as may be determined by a fair reading and interpretation of the entire specification.

A food product is provided, including a mixture of carrots; water; oats; and an acidifying agent. The acidifying agent preferably includes glucono delta lactone. The mixture preferably includes 2.8 percent to 4.9 percent carrots; 67.00 percent to 89.0 percent water; 3.20 percent to 9.9 percent oats; 3.00 percent to 10.25 percent molasses; and 0.20 percent to 1.25 percent glucono delta lactone, all percentages being by weight. The mixture alternatively includes 3.5 percent to 4.2 percent carrots; 75.0 percent to 82.0 percent water; 5.75 percent to 8.25 percent oats; 6.25 percent to 8.75 percent molasses; and 0.25 percent to 0.50 percent glucono delta lactone, all percentages being by weight. The mixture still alternatively includes 62.40 parts by weight of carrots; 23.90 parts by weight of water; 6.60 parts by weight of oats; 5.60 parts by weight of molasses; and 1.50 parts by weight of glucono delta lactone.

A method is provided of making a food product which is edible when frozen, the method including the steps of mixing food product ingredients to form a mixture; heating the mixture to a temperature for sufficient length of time to achieve sterilization of the mixture; packing the mixture while the mixture is maintained at a sterilizing temperature within a product package; substantially hermetically sealing the mixture within the product package; and storing the mixture at ambient temperature. The sterilizing temperature is preferably within a range of 185 degrees F. to 190 degrees F. The sterilizing temperature is alternatively within a range of 168 degrees F. to 200 degrees F. The method preferably includes a method of distribution and use of the food product, including the additional steps of transporting the food product to retail stores at ambient temperature; storing the food product at ambient temperature; freezing the food product; and serving the food product while it is frozen. The oats are preferably either rolled oats or powdered oats. The carrots preferably are either chopped carrots or dehydrated carrots.

A method is further provided of distributing and using a food product comprising chopped carrots; water; rolled oats; and an acidifying agent, including the steps of transporting the food product to retail stores at ambient temperature; storing the food product at ambient temperature; freezing the food product; and serving the food product while it is frozen.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to the tables and written description set forth below, a pet animal food product is disclosed having an inventive and nutritious composition, and a preparation and distribution method for the food product is disclaimed making it suitable for a cost-effective distribution and for appealing frozen presentation to the animal recipient.

The product includes dehydrated or chopped carrots, water, rolled or powdered oats, molasses and an acidifying agent such as glucono delta lactone (G.D.L.). The preferred and broad percentages of these ingredients by weight are as set forth in the following tables. TABLE 1 shows the preferred amounts of these ingredients within a single batch in weight by pounds.

EXAMPLE

The following examples are by total percentage weight unless otherwise stated. TABLE 1 provides the preferred and broad ingredient percentages by weight and TABLE 2 provides one actually tested set of ingredient proportions by weight.

TABLE 1

| Ingredient | Broad Range | Preferred Range |
|---|---|---|
| Water | 67.70–88.70 | 75.0–82.0 |
| Dehydrated Carrots | 2.89–4.89 | 3.5–4.2 |
| Oats | 3.29–9.88 | 5.75–8.25 |
| Molasses | 3.04–10.25 | 6.25–8.75 |
| G.D.L. | 0.20–1.25 | 0.25–0.50 |

TABLE 2

| Ingredient | lbs. |
|---|---|
| Carrots, chopped | 62.40 |
| Water | 23.90 |
| Rolled oats | 6.60 |
| Molasses | 5.60 |
| Glucono delta lactone | 1.50 |
| total | 100.00 |

Method

In practicing the invention, the following method may be used. The general combined method of manufacture, distribution and usage include the steps of mixing product ingredients, subjecting the mixture to a sterilizing heat treatment, enclosing the mixture at a high temperature within a hermetically sealed package, distributing the product to retail stores at ambient temperature and subsequently freezing the mixture prior to presentation to a pet animal. The specific method of manufacture of the product includes the steps of: placing all of the above-referenced ingredients into a mixing vessel in the relative amounts specified in the tables; mixing the ingredients until the oats are hydrated; heating the mixture to 190 degrees F. so that the mixture becomes the product; and then hermetically sealing the mixture within product packaging. While heating the mixture to 190 degrees is an example, the full preferred range is 185 degrees to 190 degrees F., and the broad range is 160 degrees to 195 degrees F. The specific method of distribution and use of the product includes the steps of: transporting the product at ambient temperature from the place of manufacture to shelves of stores selling to the end consumer, namely, the animal owner; freezing the product after purchase; and serving the frozen product to the animal.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A pet food product, comprising:
   a mixture of carrots; water; oats; and an acidifying agent wherein said acidifying agent comprises glucono delta lactone.

2. The pet food product of claim 1, wherein said mixture comprises:
   2.8 percent to 4.9 percent carrots;
   67.00 percent to 89.0 percent water;
   3.20 percent to 9.9 percent oats;
   3.00 percent to 10.25 percent molasses;
   and 0.20 percent to 1.25 percent glucono delta lactone, all percentages being by weight.

3. The pet food product of claim 1, wherein said mixture comprises:
   3.5 percent to 4.2 percent carrots;
   75.0 percent to 82.0 percent water;
   5.75 percent to 8.25 percent oats;
   6.25 percent to 8.75 percent molasses;
   and 0.25 percent to 0.50 percent glucono delta lactone, all percentages being by weight.

4. The pet food product of claim 1, wherein said mixture comprises:
   62.40 parts by weight of carrots;
   23.90 parts by weight of water;
   6.60 parts by weight of oats;
   5.60 parts by weight of molasses;
   and 1.50 parts by weight of glucono delta lactone.

5. The pet food product of claim 1, wherein said oats are rolled oats.

6. The pet food product of claim 1, wherein said oats are powdered oats.

7. The pet food product of claim 1, wherein said carrots are chopped carrots.

8. The pet food product of claim 1, wherein said carrots are dehydrated carrots.

9. A method of making the pet food product of claim 1 which is edible when frozen, the method comprising the steps of:
   mixing the pet food product ingredients to form a mixture;
   heating the mixture to a temperature for sufficient length of time to achieve sterilization of the mixture;
   packing the mixture while the mixture is maintained at a sterilizing temperature within a product package;
   substantially hermetically sealing the mixture within the product package;
   and storing the mixture at ambient temperature.

10. The method of claim 9, wherein the sterilizing temperature is within a range of 185 degrees F. to 190 degrees F.

11. The method of claim 9, wherein the sterilizing temperature is within a range of 168 degrees F. to 200 degrees F.

12. The method of claim 9, comprising a method of distribution and use of the pet food product, comprising the additional steps of:

transporting the pet food product to retail stores at ambient temperature;

storing the pet food product at ambient temperature;

freezing the pet food product;

and serving the pet food product while it is frozen.

* * * * *